F. C. HOWE.
AUTOMOBILE GOGGLES.
APPLICATION FILED JULY 24, 1915.
1,239,691. Patented Sept. 11, 1917.
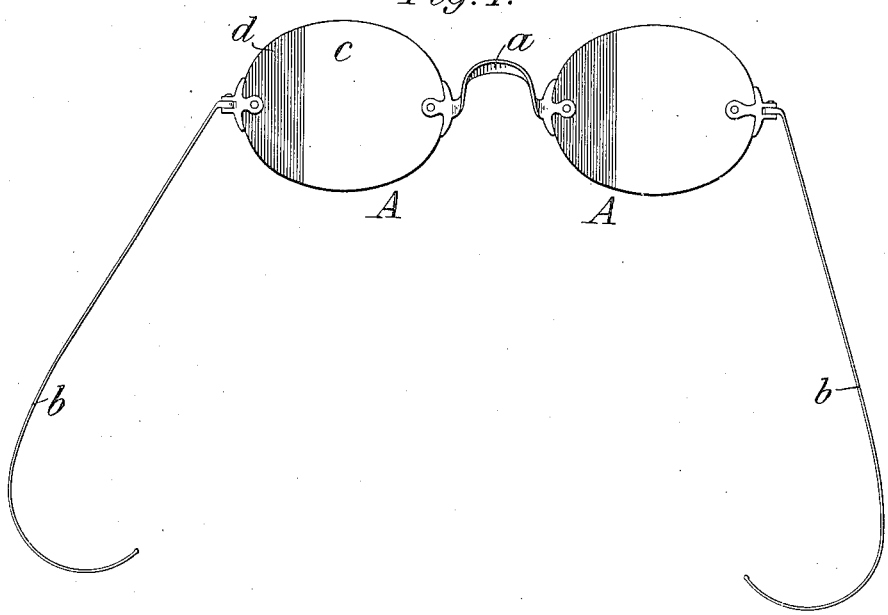
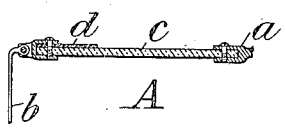
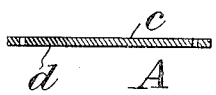
WITNESSES:
INVENTOR:
Fred C. Howe
By Attorneys,
Fraser Turk & Myers

UNITED STATES PATENT OFFICE.

FRED C. HOWE, OF NEW HAVEN, CONNECTICUT.

AUTOMOBILE-GOGGLES.

1,239,691.     Specification of Letters Patent.     Patented Sept. 11, 1917.

Application filed July 24, 1915. Serial No. 41,671.

*To all whom it may concern:*

Be it known that I, FRED C. HOWE, a citizen of the United States of America, residing in the city and county of New Haven, State of Connecticut, have invented certain new and useful Improvements in Automobile-Goggles, of which the following is a specification.

This invention relates to improvements in eye-glasses or goggles for automobilists or the like, and aims to provide improvements therein.

The glare from the head light or lights on approaching automobiles is blinding and injurious to the eyes of drivers and others in other automobiles, and the blinding effect of the glare upon drivers has frequently been the cause of accidents.

Means have heretofore been devised for protecting the drivers of automobiles from the glare of the head lights on approaching automobiles. The means which heretofore appear to have enjoyed most favor is a disk of translucent material upon the wind shield. The driver uses this disk as a shield keeping the disk between the on-coming head light and his eyes. In order to effect this, however, considerable movements of his head and body are necessitated.

It has also been proposed to provide glasses having the upper part translucent to diminish the intensity of the light coming to the eye. With the glasses just referred to, however, the wearer must bend his head, and in so doing not only diminishes the light from the head light on the on-coming automobile, but also obscures his view of objects illuminated by the lights upon his own automobile.

The present invention provides a device having advantages over those heretofore used, and particularly permits of the shielding of the eyes by a very slight movement of the head, and also permits of the obscuring of the light from the on-coming automobile without obscuring the road directly ahead illuminated by the lights of the wearer's vehicle.

The invention will be more fully described in connection with the accompanying drawing illustrating embodiments thereof.

In said drawing Figure 1 is a perspective view of eye-glasses or goggles embodying the invention.

Fig. 2 is a horizontal sectional view of a glass; and

Fig. 3 is a horizontal sectional view of another glass, both embodying the invention.

In said drawing A A represent eye-glasses, ground or not as lenses as may be desired, and connected to one another, and adapted to be attached to the wearer in any suitable manner. As here shown the glasses are connected by a nose piece $a$, preferably easily bendable so that the axes of the glasses or lenses may be readily adjusted to the distance between the eyes. Pieces $b$ $b$ adapted to fit behind the ears of the wearer may be provided for holding the glasses in place upon the user. The glasses or lenses may be arranged or not in frames provided with dust guards.

The glasses comprise a transparent or relatively transparent portion $c$ and a translucent or opaque portion $d$. In fact the transparent or relatively transparent portion may be not glass at all but simply a space. The translucent or opaque portions $d$ are arranged at the sides of the glasses. The portions $d$ are usually at the left-hand side of the glasses, but when the rule of the road is to keep to the left, the portions $d$ may be arranged upon the right-hand side of the glasses. The transparent portion is preferably so arranged that the field of vision directly in front of the opening in the eye is seen through the transparent portion.

The translucent or opaque portions may be formed in any suitable way. They may be formed by coloring the side portion of the glass, or making the side portion of the glass of a piece of colored glass, or by affixing a piece of opaque or colored material, or applying a coating of a translucent or opaque substance to the surface of the glass at one side.

In use the glasses are worn by the automobilist, who normally gazes through the transparent or relatively transparent portion $c$ thereof. When an automobile or other object, approaches or is approached, having a glaring head light, the person wearing the glasses simply turns his head slightly to the right, bringing the translucent or opaque portion at the sides of the glasses between the opening in his eyes and the source of the glaring light. The glaring light is thus so diminished or obscured as not to blind the person wearing the glasses, and the wearer of the glasses at the same time has an unobscured vision directly in front of him through the transparent or relatively transparent portion $c$ of the glasses.

The invention has been used and has been found to give very satisfactory results.

The inventive idea may receive other mechanical expressions than those herein illustrated and specifically described.

What is claimed is:—

Eyeglasses or goggles especially intended for the use of automobilists, comprising a pair of glasses, said glasses having light intercepting portions at one side of the axis of the eye, the location of the intercepting portions being such as to permit a substantially unobstructed view when the eyes are directed ahead, the view ahead being adapted to be partially covered by the intercepting portions by a turn of the head, the line of division between the covered and uncovered portions of the view ahead being substantially vertical.

In witness whereof, I have hereunto signed my name in the presence of two subscribing witnesses.

FRED C. HOWE.

Witnesses:
C. M. ROBINSON,
R. A. BRIGHAM.